(12) United States Patent
Mahimkar et al.

(10) Patent No.: US 10,374,888 B2
(45) Date of Patent: Aug. 6, 2019

(54) SCHEDULER FOR UPGRADING ACCESS POINT DEVICES EFFICIENTLY

(71) Applicants: AT&T Intellectual Property I, L.P., Atlanta, GA (US); Board of Regents, The University of Texas System, Austin, TX (US)

(72) Inventors: Ajay Mahimkar, Woodbridge, NJ (US); Zihui Ge, Madison, NJ (US); Weiyi Zhang, Edison, NJ (US); Lili Qiu, Austin, TX (US); Mubashir Adnan Qureshi, Austin, TX (US)

(73) Assignees: AT&T INTELLECTUAL PROPERTY I, L.P., Atlanta, GA (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 257 days.

(21) Appl. No.: 15/378,343

(22) Filed: Dec. 14, 2016

(65) Prior Publication Data

US 2018/0167277 A1     Jun. 14, 2018

(51) Int. Cl.
H04L 12/24         (2006.01)
(52) U.S. Cl.
CPC ........ *H04L 41/0823* (2013.01); *H04L 41/082* (2013.01); *H04L 41/145* (2013.01)

(58) Field of Classification Search
CPC .. H04L 41/082; H04L 41/0823; H04L 47/127
See application file for complete search history.

(56) References Cited

U.S. PATENT DOCUMENTS

| | | | |
|---|---|---|---|
| 8,908,553 B2 | 12/2014 | Anthony, Jr. et al. | |
| 9,009,320 B2 | 4/2015 | Shi et al. | |
| 9,253,714 B2 | 2/2016 | Lou et al. | |
| 9,265,066 B2 | 2/2016 | Goodwin et al. | |
| 9,369,925 B2 | 6/2016 | Bin Sediq et al. | |
| 10,015,070 B1* | 7/2018 | Cai | H04L 43/16 |
| 2008/0152104 A1* | 6/2008 | Keeler | H04W 24/04 379/112.01 |
| 2009/0016328 A1 | 1/2009 | Peisa et al. | |
| 2014/0126481 A1 | 5/2014 | Arulselvan et al. | |
| 2015/0296483 A1 | 10/2015 | Shi et al. | |
| 2016/0198486 A1 | 7/2016 | Moshavi et al. | |

* cited by examiner

*Primary Examiner* — El Hadji M Sall

(74) *Attorney, Agent, or Firm* — Amin, Turocy & Watson, LLP

(57) ABSTRACT

Communication networks go through frequent upgrades, whereby access point (AP) devices that serve network client devices are brought offline to effectuate the upgrade. Concurrently upgrading too many AP devices within a given geographic area can lead to coverage holes where no service is available, congestion where data cannot be sufficiently communicated, or other service degradation. On the other hand, upgrading too few AP devices within the area can result in a network-wide upgrade time that is too great. An architecture is presented that can efficiently generate a schedule for upgrading AP devices of a communication network.

20 Claims, 11 Drawing Sheets

SCHEDULER FOR UPGRADING ACCESS POINT DEVICES EFFICIENTLY

TECHNICAL FIELD

The present application relates generally to the field of communication networks and more specifically to determining an efficient schedule to be used when upgrading access point devices of a communication network.

BACKGROUND

Networks, such as cellular networks, go through frequent upgrades due to rapid changes in radio access, end user equipment, mobile applications, or the like. Today, such upgrades are manually scheduled.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
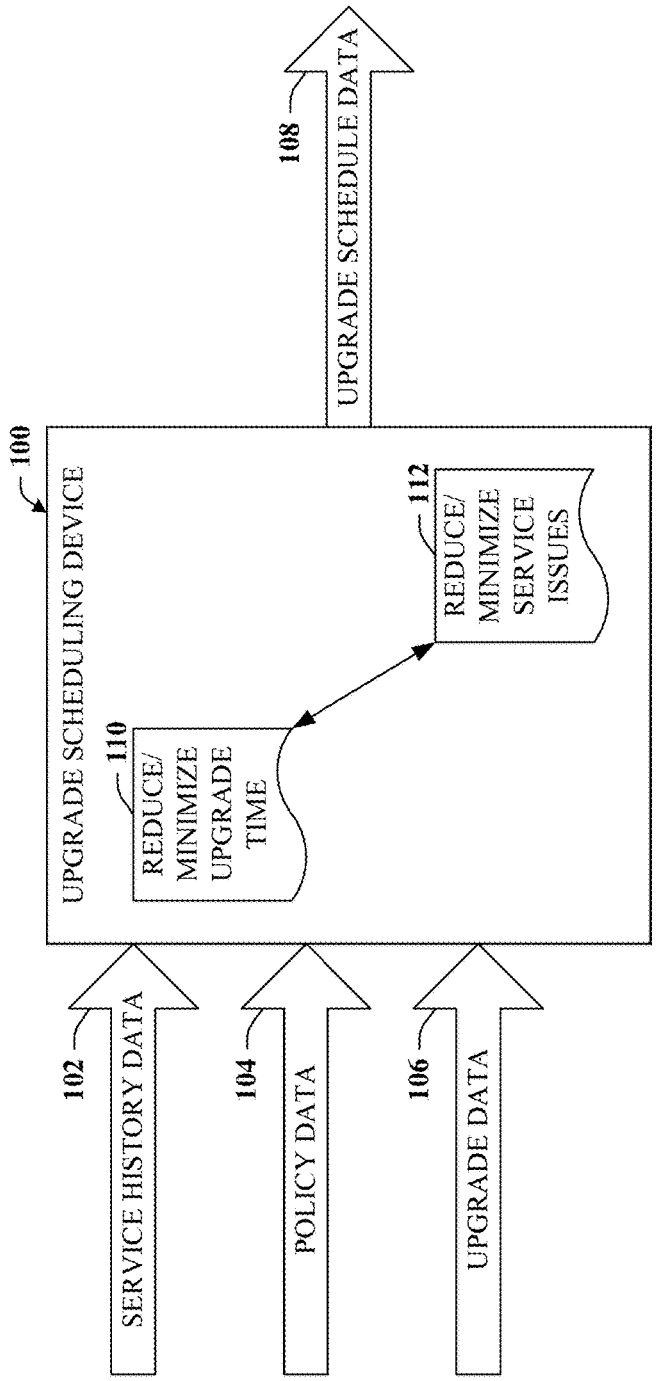
FIG. 1 illustrates a block diagram of an example system that can provide for automated and efficient scheduling of access point device upgrades in accordance with certain embodiments of this disclosure.

Today, upgrades, either software or hardware, are executed during off-peak hours (referred to as maintenance windows) in order to lower the impact of service performance disruptions during the upgrade. The upgrade involves first download and installation of the software and/or replacing equipment, and then restarting the AP. Typically, the AP device is brought offline for the entire time of the individual upgrade, which results in voice calls, data sessions, or other connections being dropped and then handed over to the neighboring AP devices. Such causes a transient service performance impact to the end-users. While the upgrade is scheduled during the maintenance window, when the traffic volume is low, the upgrade may still impact the ongoing traffic at that time even if the traffic volume is low. Moreover, it is not always possible to schedule upgrades at low traffic times. For example, busy locations like downtown or airports may have high traffic 24/7. In those cases, the performance disruption caused by the upgrade can be severe. Moreover, in some cases, the upgrade might take longer due to unanticipated alarms or network conditions and can spill-over into the peak hours of the day. Thus, it is extremely important for operational teams to plan the software upgrades in advance to ensure minimal service disruption during the upgrade.

The current execution process for a software upgrade on the access point device is completely manual. The maintenance teams execute the instructions one-by-one as documented in a MOP (Method of Procedure). An upgrade MOP consists of pre-health checks, conflict detection and resolution, implementation of the software upgrade, and finally post-health checks via performance and alarm analysis. A typical software upgrade (execution of the whole MOP) on a single AP device typically takes around 3-4 hours. This is a significant investment by the service provider in terms of human time and effort, and an important one so as to ensure that the software upgrade does not result in any unexpected degradation to service performance. The number of AP devices can be on the order of tens of thousands, so not all of them can be upgraded within a single or a small number of maintenance windows. Today, a software upgrade takes around two to four months for network-wide deployment. The operational teams' objective is to roll out the new software as rapidly as possible, but they are limited by the human time and effort as well as the risk of a service disruption caused by simultaneous execution of upgrades. Thus, scheduling of upgrades plays a very important role in the deployment of the new software across the network. Hence, subject matter disclosed herein can improve the scheduling process in a communication network by, e.g., automating scheduling of the upgrades to speed up network-wide deployment of the software, minimizing the service disruption, and reducing management cost and effort.

Today, scheduling of software upgrade in operational cellular networks involves the operational teams to submit an upgrade request to a central change management calendaring system, which mainly identifies any overlapping scheduled activities within the same time window. The overlapping activities are competing for the same time slot for execution and thus as referred to as change conflicts. The conflicts are then manually resolved by interactions across multiple operations teams. Clearly, this process is time-consuming and sometimes enforcing resolution of conflicts is hard because of involvement from multiple operational teams. There is also no explicit consideration of service impact. The operations teams manually select the time slots and locations of the AP devices to be upgraded, sometimes without any consideration to service impact other than to upgrade during the maintenance window. Such results in lengthy software deployments, which is undesirable if the network needs to be quickly upgraded either to fix any software bugs, or introduce any new service features. At times, the operational teams schedule and execute upgrades during the maintenance window in the hope of minimal disruption during off-peak hours.

As noted, today, upgrades to communication networks such as cellular networks are manually scheduled. If not managed carefully, manual upgrades can easily lead to difficulties such as, for example, coverage holes, performance degradation, prolonged upgrade time, and so forth. Such difficulties can be mitigated by exploring how to automatically schedule upgrades, which can result in a reduction of the upgrade time as well as a reduction to impact to service performance. Generally, such can be accomplished by formulating a series of scheduling problems to account for different performance objectives (e.g., no coverage holes, no-congestion, or balancing the upgrade time and disruption during the upgrade) and different usage scenarios (e.g., one or multiple upgrade jobs per access point (AP) device). A scheduling conflict graph can be constructed to reflect design requirements, and develop optimization algorithms to reduce the upgrade time while satisfying the performance requirements.

Given the large-scale of cellular (or other) networks (e.g., tens of thousands of AP devices or more), it can be beneficial to automate aspects of upgrading, including conducting pre/post health checks, scheduling upgrades, executing planned work orders, analyzing alarms, detecting performance impact, and so forth. Today, all these tasks are done manually and can incur a significant operational cost in terms of time, money, or other resources, and sometimes result in service performance disruption, which can lead to a loss of goodwill from customers or others. Sometimes, operational teams that schedule upgrades manually, upgrade one AP at a time, which leads to an unnecessarily long time to complete all upgrades. Other times, these operational teams may unintentionally overlap upgrades of multiple nearby APs, which can lead to coverage holes or congestion.

A challenge involved in upgrade scheduling is that upgrading an AP device generally requires bringing down the AP device. Typically, during the upgrade, the AP device will be offline and unable to provide service. Thus, upgrade scheduling should be done with extreme caution to ensure upgrading APs does not leave coverage holes or incur performance degradation for the service area covered by the AP being upgraded. Because of rapidly changing technology, network upgrades can occur quite frequently (e.g., several times a year). Hence, for large networks with tens- or hundreds of thousands of AP devices, upgrading one or a small number of AP devices at a time can result in an upgrade time that is significantly longer than the upgrade cycle. Moreover, it can be extremely beneficial to implement upgrades rapidly in order to, e.g., quickly provide new network aspects or features, or improved service that prompted the upgrade, to users of the network.

Scheduling upgrades in communication networks can be advantageous since scheduling not only impacts the time to complete upgrade, but also significantly impacts the user performance during the upgrade. There are a number of desirable goals, such as, for example:

Minimize or reduce time to complete upgrades;
Ensure coverage adequate during upgrades (e.g., ensuring all clients are still covered by the remaining APs while the other APs are brought down for upgrades);
Ensure no or reduced congestion (e.g., ensuring all clients' traffic can still be served by the remaining APs that are not being upgraded concurrently);
Support networks with different generations (e.g., 2G, 3G, 4G clients and APs).

Job scheduling has been studied extensively. Previous work in the domain of job scheduling provides excellent surveys of scheduling algorithms Abstractly, a scheduling problem is defined by (1) the machine environment (e.g., one machine vs. multiple machines that can accept jobs), (2) optimality criterion (e.g., average completion time, worst-case completion time, weighted average completion time, or minimizing the number of jobs missing their deadlines), and (3) constraints (e.g., preemptive vs. non-preemptive, or precedence constraints). Thousands of scheduling problems have been studied depending on the specifications of these three components.

Scheduling upgrades in communication and/or cellular networks differ from the existing scheduling work due to the new constraints (e.g., ensuring coverage or no-congestion). Hence, here, the job schedule is not limited by the machine capacity as in the traditional scheduling problems, but by the relationships of the locations of the jobs (e.g., to ensure coverage or other objectives, not all AP devices covering the same physical area can be upgraded together).

In order to best explain the disclosed subject matter in view of the challenges noted above, example scheduling problems are examined incrementally. For example, the basic case is first described, and then subsequently augment to incorporate additional objectives and constraints.

In the simplest case, all upgrade jobs take the same amount of time and service constraints require only that no coverage holes exist, e.g., that all regions are still covered by the remaining AP devices not being contemporaneously upgraded). Since upgrade jobs have the same duration, minimizing the upgrade time is equivalent to minimizing the number of rounds to finish upgrades. This essentially means partitioning all the AP devices that require upgrades into the smallest number of rounds, where the AP devices in each round can be upgraded together without coverage holes.

In practice, it can be advantageous that not only all regions be still covered, but also that there be no congestion. In other words, not only are all regions covered, but all traffic demands from each region can be served by the remaining active APs while some APs are being upgraded and out of service. An algorithm can be developed to compute how much traffic the active AP devices can serve and whether there is congestion as a result. This algorithm can be incorporated to strategically select AP devices in each round to minimize or reduce the number of upgrade rounds.

It is further observed that in practical usage scenarios it is common to run multiple upgrade tasks on an AP device sequentially, one upgrade after another. Such provides motivation to extend scheduling algorithms to accommodate multiple separate upgrade tasks per AP, with ordering constraints.

In general, different upgrade jobs may take different amounts of time. Hence, an additional scheduling algorithm can be developed that takes into account not only the topology and traffic demands, but also the upgrade durations.

Various other practical issues can be considered, such as supporting backward compatibility between different cellular generations, trading off between performance degradation and upgrade time, running in a hierarchical manner to reduce computation time, and so on. Certain interesting scheduling problems can be formulated for the above variants, and associated algorithms can be developed. The automated scheduler and related elements are believed to be the first automated schedule optimizer for communication (e.g., cellular) network upgrades. Advantageously, the scheduler can automatically learn the inputs required for the scheduling problems using readily available traces from major networks. The disclosed subject matter, in some embodiments, can lead to minimal or reduced service disruptions, faster execution of upgrades, better utilization of operational resources, and significant cost reduction.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, upgrade scheduling device 100 is depicted. Upgrade scheduling device 100 can provide for automated and efficient scheduling of access point device upgrades. In some embodiments, such can minimize or reduce network-wide upgrade completion time while also minimizing or reducing the impact to services provided by the access point (AP) devices being upgraded. Generally, upgrade scheduling device 100 can comprise a processor and a memory that stores executable instructions that, when executed by the processor, facilitate performance of operations. Examples of the memory and processor can be found with reference to FIG. 11. It is to be appreciated that the computer 1102 can represent a server device of a communications network or a user equipment device and can be used in connection with implementing one or more of the systems, devices, or components shown and described in connection with FIG. 1 and other figures disclosed herein.

Upgrade scheduling device 100 can receive service history data 102. Service history data 102 can be representative of service metrics for access point devices that are to undergo upgrade procedures. Various examples of service history data are provided in connection with FIG. 2A. As used herein, access point (AP) devices can refer to substantially any suitable device that enables a user equipment (UE) to access a communication network. Examples can include a base station, a nodeB, an enhanced nodeB (eNB), or other suitable macro radio access network (RAN) devices. In some cases, an AP device can also represent microcells, picocells, femtocells or the like. AP devices that are to undergo upgrade procedures can be referred to herein as the "schedulable set". The schedulable set can include all or a portion of a given network provider's AP devices. The schedulable set can be reduced by removing members that have been upgraded or have been scheduled for upgrade.

Figure 2A:
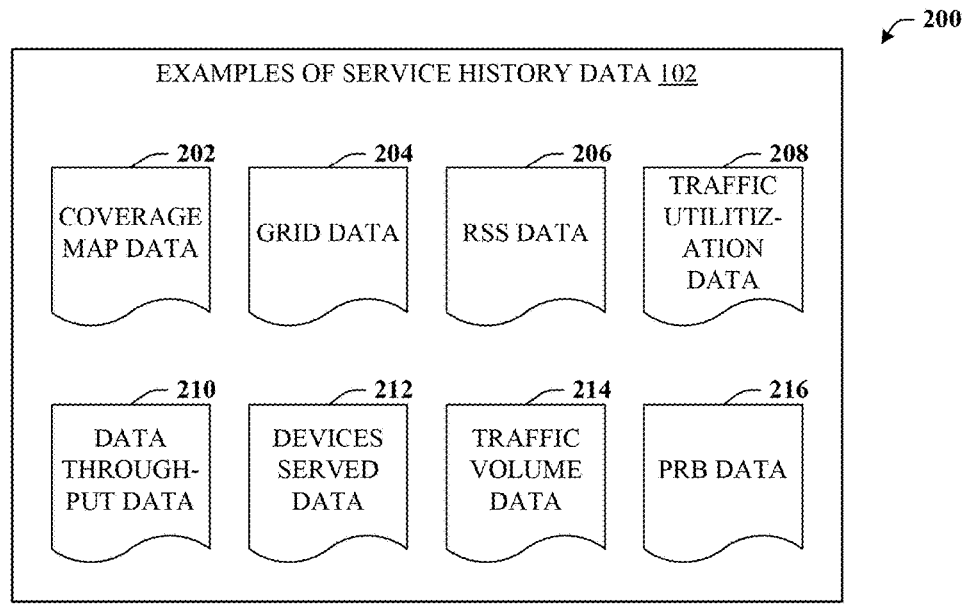
FIG. 2A depicts a block diagram that illustrates various examples of service history data in accordance with certain embodiments of this disclosure.
Figure 2B:
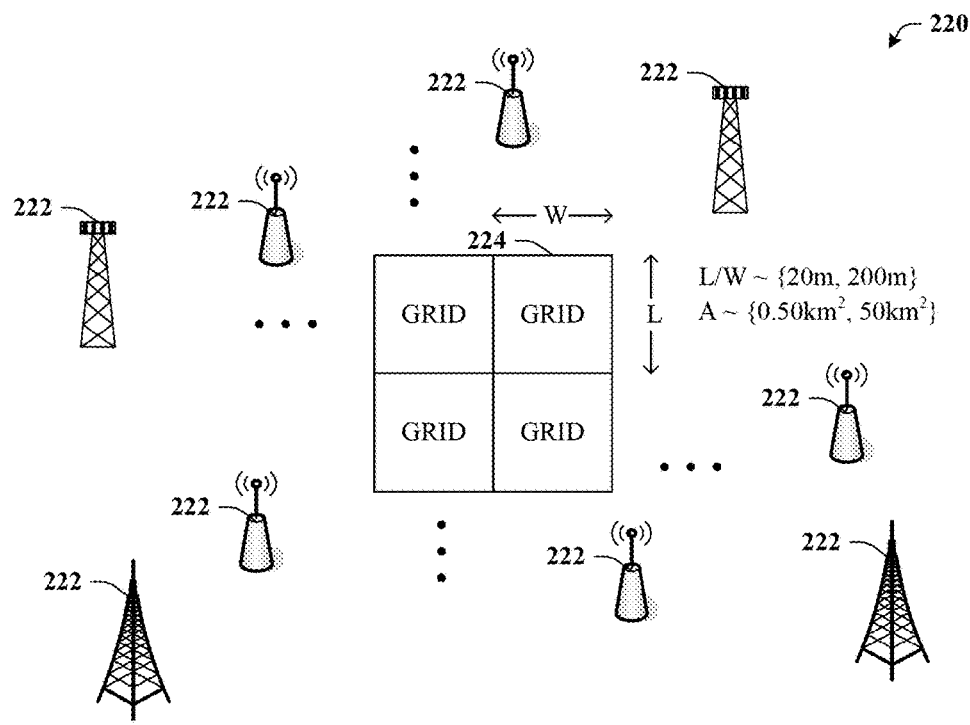
FIG. 2B depicts graphical depiction of an example coverage area that is partitioned into grids in accordance with certain embodiments of this disclosure.

While still referring to FIG. 1, but turning now as well to FIGS. 2A and 2B, various examples are provided. For instance, FIG. 2A depicts a block diagram 200 illustrating various examples of service history data 102. For example service history data 102 can include coverage map data 202. In some embodiments, coverage map data 202 can represent a geographical coverage area of the AP devices of a network provider, including those AP devices that are to be upgraded. In some embodiments, this geographic coverage area can be partitioned into grids, which can be represented by grid data 204 and can be further detailed with reference to FIG. 2B.

FIG. 2B provides graphic depiction 220 of an example coverage area that is partitioned into grids. In this example, several AP devices 222 provide service at a geographic area illustrated by grid 224. In some embodiments, grid sizes and shapes can be configurable. For example, as will become apparent, larger grid sizes can reduce computation time, whereas smaller grid sizes can provide finer granularity results. In this example, grid 224 has a rectangular or square shape, but other shapes may be possible. In some embodiments, a length (L) and a width (W) of grid 224 can be in a range of about 20 meters to about 200 meters. In some embodiments, L and W of grid 224 can be about 100 meters or about 50 meters. Additionally or alternatively, an area (A) of grid 224 can be in a range of about 0.5 $km^2$ to about 50 $km^2$. It should be understood that the various grids (e.g., 224) can be distinct from (and independent of) conventional sector maps, which are traditionally not configurable and generally relate to larger areas.

Turning back to FIG. 2A, as noted, service history data 102 can include various service metrics, examples of which are provided at reference numerals 206-216. For example, a service metric can relate to a received signal strength (RSS) data 206, traffic utilization data 208, data throughput data 210, devices served data 212 (e.g., total number), traffic volume data 214, physical resource block (PRB) data 216, and so forth. In some embodiments, the service metrics associated with data 206-216 can be specific to a particular grid, such as grid 224.

It is understood that all or a portion of service history data 102 can be acquired by network traces. Analysis of traces for one years' worth of operational data collected from a cellular network undergoing an upgrade has led to a number of observations. First, there were planned upgrades every day throughout the year. Weekdays and non-holidays saw more upgrades than weekends and holidays likely because upgrades are currently manual processes and more staff work during weekdays and non-holidays to manage upgrades. Second, the upgrade takes time: often around a few hours on a single AP device and can take on the order of weeks to months for tens of thousands of AP devices of a communication network. Third, if not scheduled carefully, it is easy to cause service disruption.

These observations provide motivation to automate the scheduling process that not only speeds up the deployment of the new software across the network but also minimizes the disruption to service performance Thus, the trace data used to compile service history data 102 can be collected for both (a) planning in advance, potentially days before the upgrades are actually executed (referred to as "compile-time data"), and (b) for pre-execution check, potentially minutes or hours before the upgrade to take into account any network topology, traffic, and capacity changes (referred to as "runtime data").

Figure 3A:
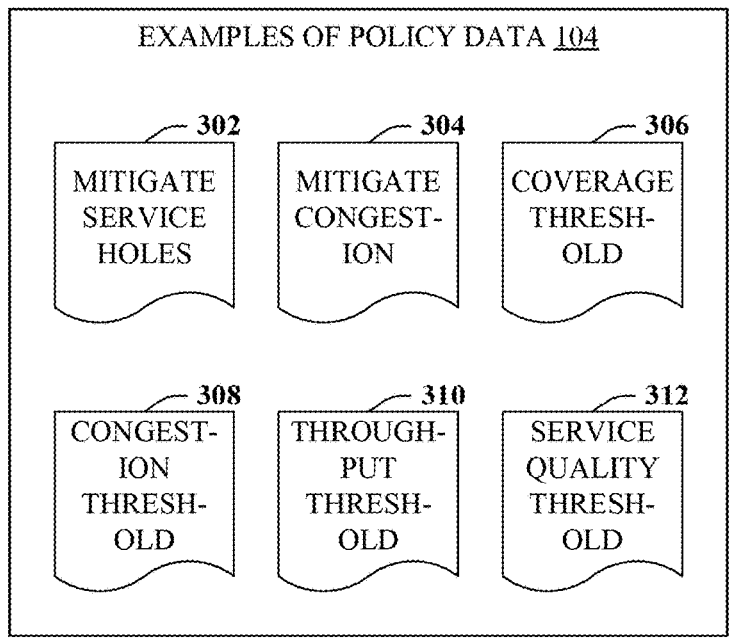
FIG. 3A depicts a block diagram that illustrates various examples of policy data in accordance with certain embodiments of this disclosure.
Figure 3B:
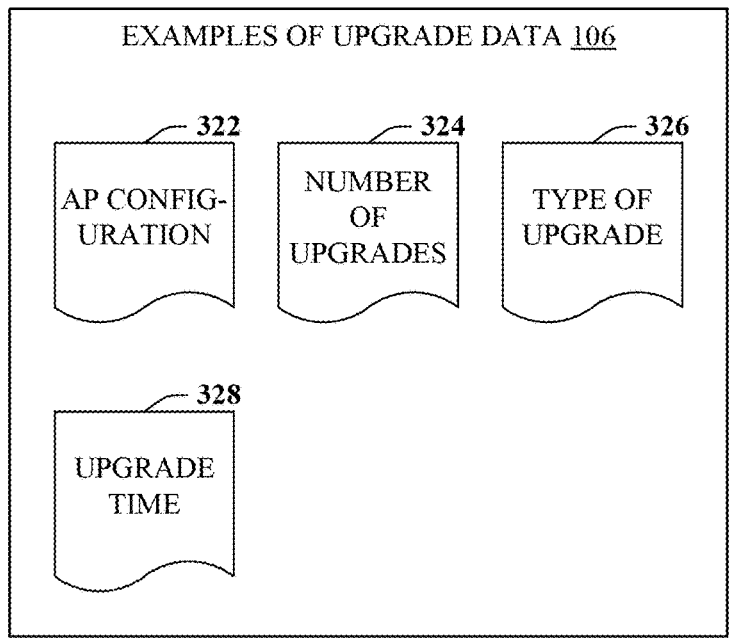
FIG. 3B depicts a block diagram that illustrates various examples of upgrade data in accordance with certain embodiments of this disclosure.

Still referring to FIG. 1, in addition to service history data 102, upgrade scheduling device 100 can receive policy data 104. Additionally, upgrade scheduling device 100 can receive upgrade data 106. Policy data 104 can be representative of service objectives to be satisfied during the upgrade procedures. Upgrade data 106 can describe the upgrade procedures. FIG. 3A provides various examples of policy data 104 and FIG. 3B provides various examples of upgrade data 106. FIGS. 3A and 3B can now be referenced alongside FIG. 1.

Turning now to FIG. 3A, a block diagram 300 is depicted. Block diagram 300 illustrates various examples of policy data 104. For example, policy data 104 can relate to mitigating service holes 302 or mitigating congestion 304. Such can refer to an importance or weight ascribed to mitigating service holes 302 (e.g., ensuring all portions of grid 224 have coverage) or mitigating congestion 304 (e.g., ensuring all portions of grid 224 not only have coverage but have adequate coverage to mitigate congestion).

As other examples of policy data 104, such can relate to various thresholds. For instance, a coverage threshold 306 or a congestion threshold 308 that can respectively indicate a baseline coverage percentage or proportion desired during the upgrade, and a baseline congestion measure that should not be exceeded during the upgrade. Another example can be throughput threshold 310 that can indicate a minimum throughput that should be observed (e.g., at grid 224) during the upgrade. Other examples can exist, such as service quality threshold 312, which can relate to a minimum threshold for some service quality metric such as those described in connection with data 206-216 of FIG. 2A, or some quality relating to service protocol (e.g., 2G vs. 5G, or the like).

FIG. 3B depicts block diagram 320. Block diagram 320 illustrates various examples of upgrade data 106. For example, upgrade data 106 can relate to AP configuration 322, such as a type of AP device, a protocol or standard (e.g., LTE, 2G, etc.) used by the AP device, current settings or a current configuration of an AP device to be upgraded, and so on. Upgrade data 106 can also relate to a number of upgrades 324, such as the number of (e.g., one or multiple) upgrades that are to be performed during the upgrade procedure (e.g., while the AP device is offline). Yet another example of upgrade data 106 can be type of upgrade 326, such as hardware, software, or both, a version number, etc. Still another example of upgrade data 106 can be upgrade time 328, such as an estimated time the AP device will be offline. It is understood that upgrade data 106 can be specific to an individual AP device to be upgraded or a group of AP devices to be upgraded.

Still referring to FIG. 1, as described above, upgrade scheduling device 100 can receive service history data 102, policy data 104, and upgrade data 106. Based on these data, e.g., service history data 102, policy data 104, and upgrade data 106, upgrade scheduling device 100 can determine upgrade schedule data 108. Upgrade schedule data 108 can be representative of an automated and/or machine-generated schedule to upgrade the access point devices of a communication network (e.g., access point devices that are members of the schedulable set). Such is distinct from previous approaches in which schedules are determined manually.

In some embodiments, the schedule (and/or upgrade schedule data 108) can reflect a number (e.g., 1 to R, where R can be substantially any positive integer) of upgrade rounds, wherein the rounds can have a specified order and a given round can specify the AP devices that can be upgraded (and therefore brought offline) together and or concurrently.

In some embodiments, upgrade schedule data 108 can be constructed based on a determined balance between two or more objectives. For example, a first reduction or minimization of a total time period to perform the upgrade procedures (e.g., network-wide upgrade time), which is represented by reference numeral 110, can be a first objective. As another example, a second reduction of service degradation due to the upgrade procedures, which is represented by reference numeral 112, can represent a second objective. Hence, generation of upgrade schedule data 108 can reflect a balance between objective 110 and objective 112. Such is distinct from previous approaches in which schedules are determined manually and with insufficient regard to reducing service degradation.

Figures 4A, 4B:
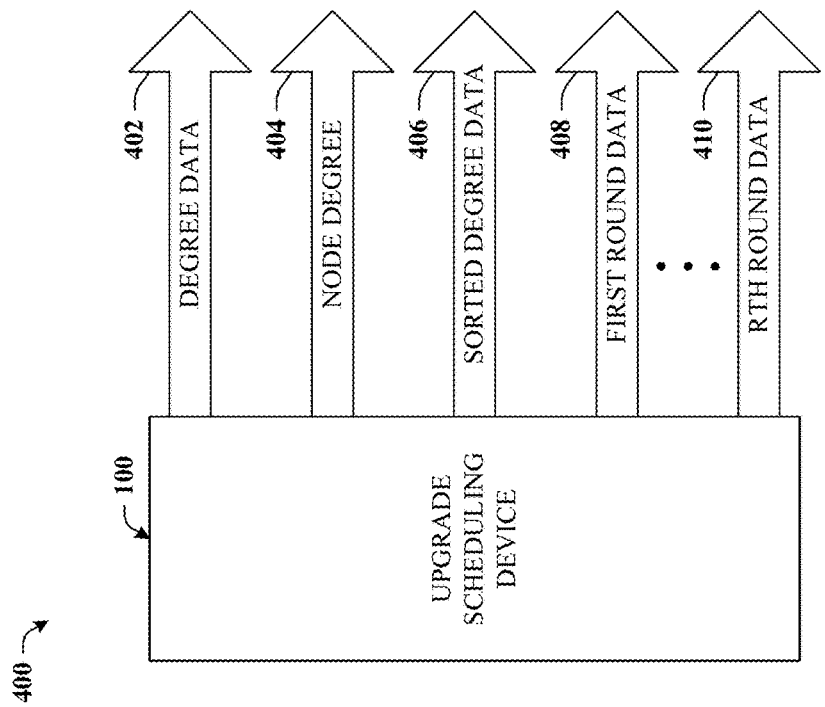
FIG. 4A illustrates a block diagram of an example system that provides for additional elements or aspect in connection with automated and efficient scheduling of access point device upgrades in accordance with certain embodiments of this disclosure.
FIG. 4B depicts a block diagram that illustrates an example of degree data in accordance with certain embodiments of this disclosure.

Referring now to FIG. 4A, system 400 is depicted. System 400 provides for additional elements or aspect in connection with automated and efficient scheduling of access point device upgrades. System 400 can comprise upgrade scheduling device 100 that can generate upgrade schedule data 108 as detailed in connection with FIG. 1. In some embodiments, in order to generate upgrade schedule data 108, upgrade scheduling device 100 can first generate degree data 402. An example of degree data 402 is provided in connection with FIG. 4B, which can now be referenced.

While still referring to FIG. 4A, but turning as well to FIG. 4B, block diagram 420 is depicted. Block diagram 420 illustrates an example of degree data 402. As illustrated, in some embodiments, degree data 402 can comprise a list of identifiers 422 of the access point devices. Such is represented by "AP ID" of FIG. 4B, which identifies some positive integer, N, different AP devices. The list of N AP devices can represent the schedulable set. Degree data 402 can further comprise corresponding node degrees $404_1$-$404_M$ for some positive integer, M, different grids. A given node degree (e.g., $404_1$) can represent an amount of service an access point device (e.g., AP ID=1) provides at a given grid (e.g., grid 224).

In this example, $AP_1$ provides about 0.9% of the service that is provided at $grid_1$, but does not cover $grid_M$. $AP_2$ provides about 24% of the service that is provided at $grid_1$ and about 8.1% of the service that is provided at $grid_M$. $AP_N$ provides about 5% of the service for $grid_1$ and about 13.2% of the service for $grid_M$. Research indicates that, for a large cellular provider, an average grid located in an urban area is covered by about 30-50 AP devices, whereas an average rural area grid may be covered by about 5-10 AP devices.

Still referring to FIG. 4A, in some embodiments, upgrade scheduling device 100 can generate sorted degree data 406. Sorted degree data 406 can be representative of the list of identifiers (e.g., in degree data 402) that are sorted according to node degree 404. In some embodiments, sorted degree data 406 can be sorted in ascending order such that the AP device with the smallest node degree 404 value for a given grid is first on the sorted list, and so on.

Upgrade scheduling device 100 can then generate a number (e.g., positive integer), R, of upgrade rounds, whereby the order of the rounds can represent the schedule. Such is illustrated by first round data 408, which can comprise a first group of identifiers that identify a first portion of the access point devices that are scheduled to be upgraded together in a first round of the schedule. Upgrade scheduling device 100 can select members of the first group according to an order of sorted degree data 406 and/or by selecting an identifier (of an access point device) that corresponds to a lowest node degree 404.

Figure 5:
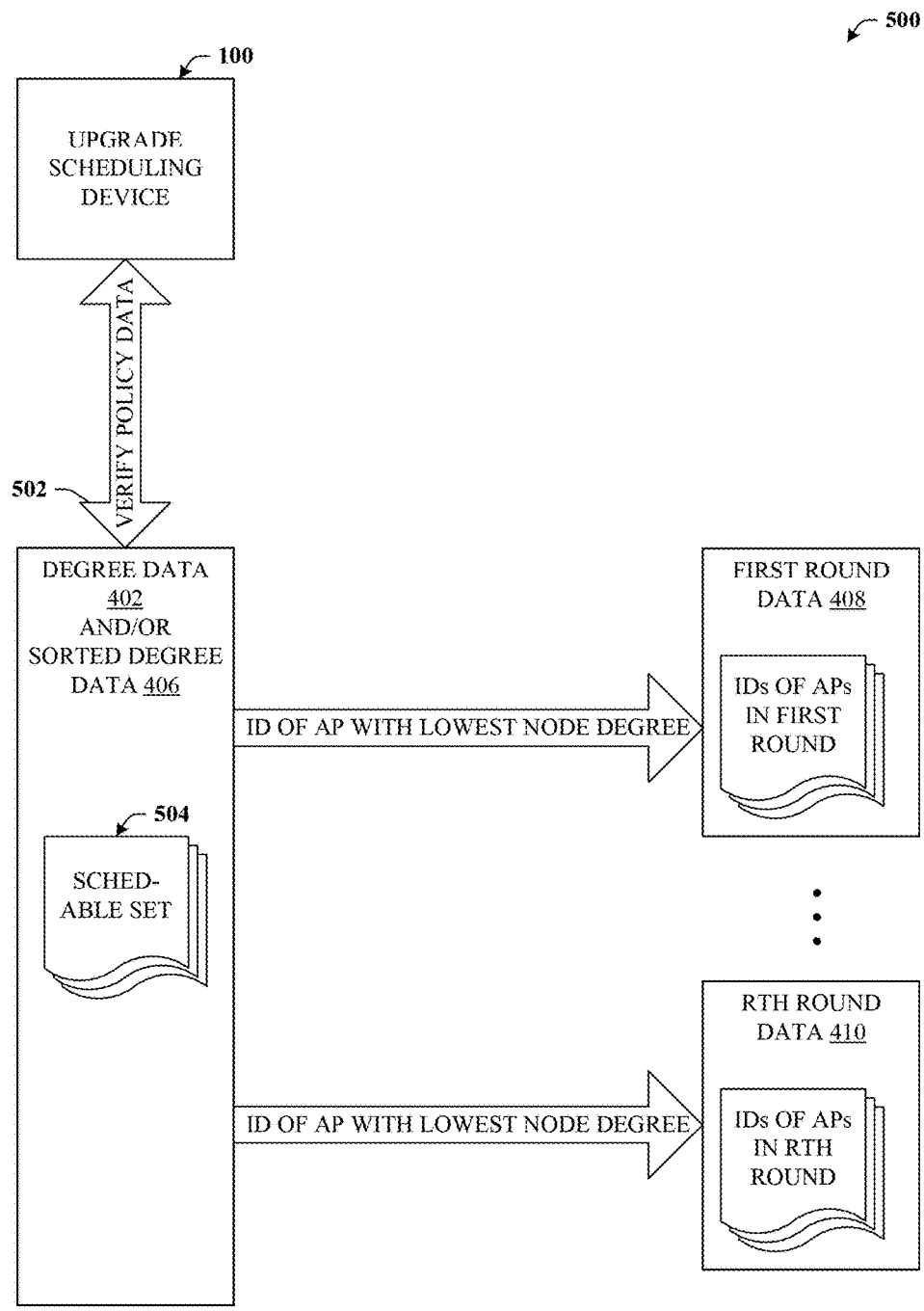
FIG. 5 illustrates a block diagram of an example system that can provide for determining upgrade schedule data 108 based on an iterative procedure in accordance with certain embodiments of this disclosure.

While still referring to FIG. 4A, but turning as well to FIG. 5, system 500 is depicted. System 500 can provide for determining upgrade schedule data 108 based on an iterative procedure. For example, the iterative procedure can comprise selecting an identifier that identifies the access point device with a lowest node degree 404. The iterative procedure can comprise determining that service at the grid satisfies policy data 104 when members of the first group and the first access point device are brought offline to effectuate the upgrade procedures. Such can represent a verification of policy data 104 and is labeled with reference numeral 502. The iterative procedure can further comprise adding the identifier that identifies the access point device with a lowest node degree to the first group (of first round data 408) and removing the identifier from degree data 402 and/or sorted degree data 406, which is labeled as schedulable set 504.

In some embodiments, when service at the grid no longer satisfies policy data 104 (e.g., bringing down an additional AP device will no longer provide to a grid a specified service metric or the like), then first round data 408 can be finalized. Members of the first group of identifiers can be deemed to be "scheduled" and thus no longer members of schedulable set 504. Similar operation can occur to populate a second group of second round data (not shown) and so on to populating Rth round data 410. Once all AP devices identified by the first group of identifiers (of first round data 408) are upgraded, then AP devices identified by a second group can be upgraded and so on until the Rth group (represented by Rth round data 410).

Figure 6:
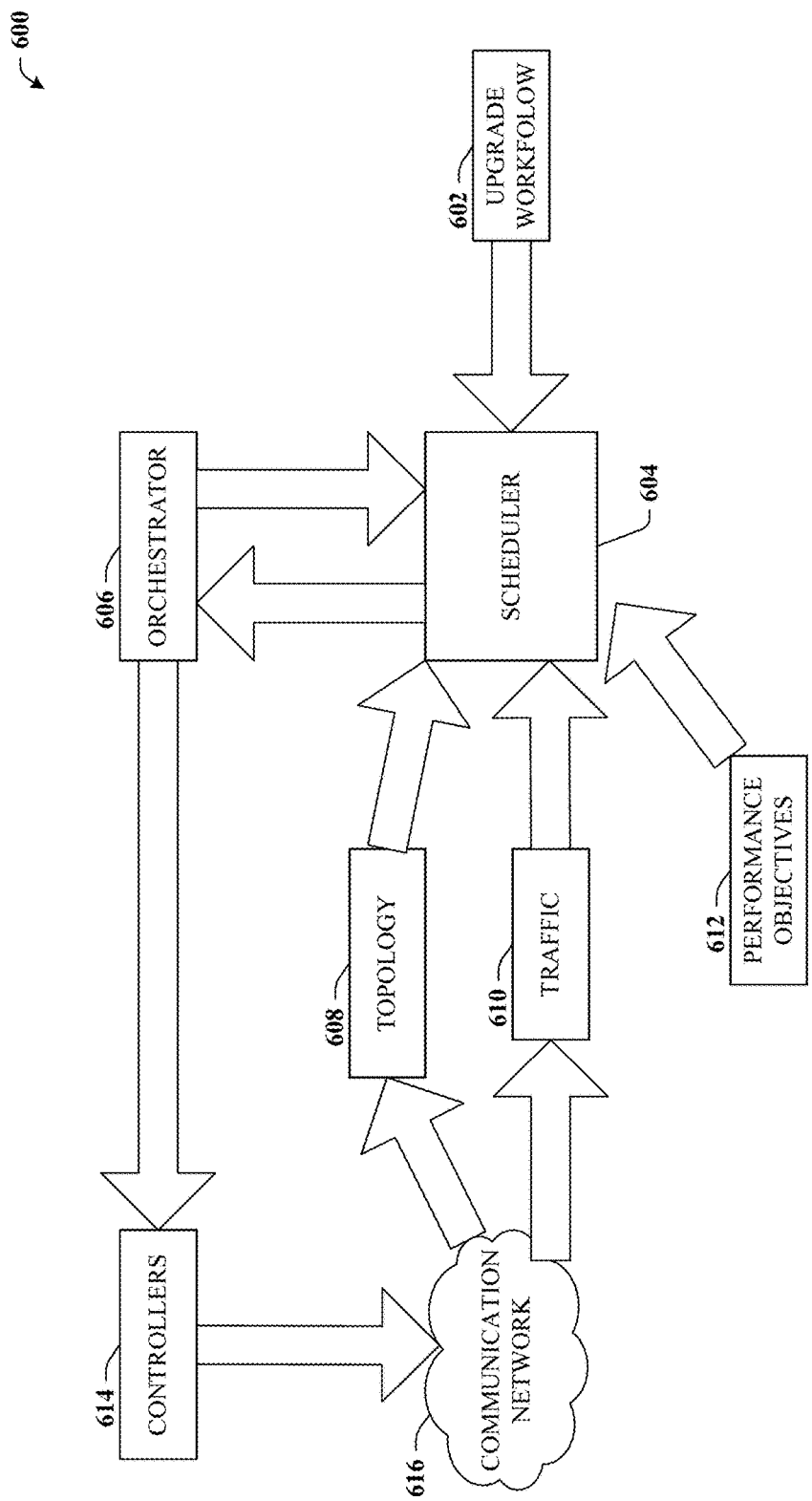
FIG. 6 illustrates a block diagram of an example system that illustrates an example upgrade workflow in connection with integration of certain disclosed concepts in a software-defined network environment in accordance with certain embodiments of this disclosure.

Turning now to FIG. 6, system 600 is depicted. System 600 illustrates an example upgrade workflow in connection with integration of certain disclosed concepts in a software-defined network environment. There is an increasing impetus on major communication network (e.g., cellular and Internet service) providers to adopt Software Defined Networking (SDN) into their network deployments. Various elements of the disclosed subject matter such as an automated scheduler can fit into such an ecosystem as shown at FIG. 6. The upgrade workflow consists of the sequence of instructions as defined in the MOP. The workflow can be viewed as a template for executing a specific type of software upgrade. When the upgrade workflow 602 is ready, scheduler 604 can be queried at compile-time (e.g., days before the upgrade) to seek a range of dates and the order for the upgrade. In some embodiments, scheduler 604 can be representative of upgrade scheduling device 100.

Once the schedule (e.g., upgrade schedule data 108) is ready and approved by the operations team, such can be passed to an orchestrator 606 that prepares for the execution of the upgrades. The orchestrator 606 can query the scheduler 604 in run-time (e.g., minutes or hours before an upgrade) and can obtain the schedule to be followed for executing the upgrades across multiple AP devices in the communication (e.g., cellular) network. Since this operation can be conducted at run-time, the scheduler 604 can seek the most recent view of topology 608, traffic 610, and performance objectives 612 from the underlying communication network and can provide an order of the nodes for executing the software upgrade. In some embodiments, topology 608, traffic 610, and performance objectives 612 can be representative of service history data 102 and policy data 104, whereas upgrade workflow 602 can be representative of upgrade data 106. Depending on the schedule, the orchestrator 606 can then instruct the controllers 614 to execute the instructions on the appropriate AP devices of communication network 616.

Additional Example Embodiments

As a means of formulation, we first consider ensuring coverage constraints. Suppose we want to upgrade AP devices in a given area. The area has W AP devices. Among them, we are to upgrade U AP devices. We divide the entire area into smaller grids, where for each grid we measure the received signal strength (RSS) from all AP devices that can be detected. If the grid receives RSS higher than a given threshold from an AP, we say the grid can be served or covered by the AP. Based on this information, our goal can be to minimize the amount of time it takes to complete upgrades while ensuring all grids in the area is covered by at least one AP. For simplicity, we first assume all upgrades take the same amount of time and aim to minimize the number of rounds during the upgrade. Subsequently, we minimize the upgrade time where different APs may have different upgrade time.

We observe if a grid is covered by two APs (e.g., A and B), then these two APs cannot be upgraded at the same time to ensure coverage. In general, for a grid that is covered by N APs, these N APs cannot all be upgraded at the same time.

Thus, a suitable approach can be to develop a greedy heuristic to minimize the number of rounds to upgrade by maximizing the number of nodes (e.g., APs) to upgrade in each round. Every round, we try to pick a large schedulable set such that all nodes in the set can be upgraded together without leaving coverage holes. Each AP is assigned with a node degree, defined as $\max_g$ $$\frac{1}{N_g},$$

where $N_g$ is the size of grid g and $$\frac{1}{N_g}$$

is the amount of coverage and/or service the AP provides to the grid g. A node with a higher degree is less likely to be upgraded together with other nodes than a node with a lower degree. For example, a node with degree 1 means it is the only covering AP for some grid and cannot be upgraded without coverage holes. Inspired by the heuristic to find a large independent set, we sort all APs to upgrade in an increasing order of their node degrees. Then we add the first node from the sorted list to the upgrade list, and gradually add one node at a time as long as upgrading all nodes in the list does not cause any grid to have no AP covering it. To achieve that, every time an AP is added to the upgrade list, we remove it from the grids it covers. We then check if there exists a grid such that the current AP is its only covering AP. We continue until we exhaust the sorted list. This forms a set of nodes to upgrade in the first round. After these nodes finish upgrading, we remove them since they no longer need upgrade. We repeat the process e.g., sorting the remaining APs to be upgraded in an increasing order of their degrees and add one node at a time from the sorted list to the upgrade list as long as the coverage constraints hold). We iterate until we upgrade all nodes that require upgrade.

With regard to a lower bound, it can be desirable to know how far our algorithm is from the optimal. It can be hard to exactly compute the minimum upgrade rounds. However, we can derive a lower bound. It is not difficult to see that if we find a set of nodes such that none of any two APs in this set can be upgraded together (called our notion of clique), the size of this set imposes a lower bound on the number of upgrade rounds. This is because all nodes in this set needs a separate upgrade round. The size of any clique is a lower bound. The larger the clique we find, the tighter the lower bound. However, even the maximum clique may be a loose bound since scheduling another clique after the first clique may require adding one or more new rounds. For example, cliques 1 and 2 both consist of 5 nodes. After scheduling clique 1 by upgrading one node in each round, we may not be able to schedule all nodes in clique 2 in the existing 5 rounds due to possible conflicts between nodes in cliques 1 and 2. Nevertheless, such a loose lower bound provides a useful baseline. To tighten the bound, we enumerate multiple cliques and use the size of the largest clique as the final lower bound.

As an additional constraint, we can consider scheduling that looks at congestion. The above formulation only ensures every grid is covered by at least one AP. In many cases, it can be beneficial to ensure not only coverage but also no congestion (e.g., the traffic from all grids can be served by the remaining active AP devices).

As before, we aim to minimize or reduce the number of upgrade rounds. In this case, we can partition all APs that require upgrade into the minimum number of partitions, where after removing each partition the coverage and capacity constraints should still be satisfied. As in the previous formulation, to minimize the number of partitions (or upgrade rounds), we try to maximize the size of schedulable set in each round by sorting nodes in an increasing order of their node degrees and adding them iteratively as long as all traffic demands are satisfied after their removal. The only issue remaining is computing the amount of traffic that can be served by a given set of AP devices, which can be formulated as a logical problem to compute maximum traffic that can be served by a given set of APs according to the below linear program:

Input: Rate(i,j), Demand(i), Cap(j)
Output: T(i,j),x(i,j)
maximize: $\Sigma_{i,j} T(i,j)$
subject to:

$\Sigma_j T(i,j) \leq$ Demand($i$) $\forall i$      [C1]

$T(i,j) \leq x(i,j)$Rate($i,j$) $\forall i,j$      [C2]

$\Sigma_i x(i,j) \leq 100\%$ $\forall j$      [C3]

$\Sigma_i T(i,j) \leq$ Cap($j$) $\forall j$      [c4]

Where T(i,j) is the amount of traffic from grid i that can be served by AP j, where Rate (i,j) is the data rate between grid i and AP j, where Demand(i) is grid i's traffic demand, and where Cap(j) is AP j's server or wireline capacity.

Maximizing traffic served by a set of APs: We formulate the following linear program to maximize the traffic demand that can be served by a given set of AP devices. If the maximum demand is equal to the total generated traffic demand, then there is no congestion.

To compute the throughput a set of APs can support, we construct a linear program as shown above. An objective of the linear program in some embodiments is to maximize the total traffic that can be served by a set of APs. [C1] reflects the total traffic that can be served from a grid is no more than its traffic demand. Here, we assume that a grid may be served by different APs, which is common in reality.

[C2] reflects the total served traffic from grid i cannot exceed Rate(i,j) x(i,j), where Rate(i,j) is the data rate between grid i and AP j and x(i,j) denotes the fraction of time the AP j spends serving the grid i. Rate(i,j) can be determined by the signal-interference-noise ratio (SINR). We can map SINR to Rate according to 3GPP LTE standard. [C3] reflects that the amount of time an AP can serve all grids cannot exceed 100%. [C4] indicates total traffic each AP can serve is bounded by its capacity (e.g., the minimum between the server capacity and wireline capacity at the AP).

Lower bound: To assess the quality of this solution, we can again use the scheme of the first formulation to compute the lower bound. In this case, the lower bound can be looser, e.g., since it only considers coverage constraints, and does not consider no-congestion constraints.

Supporting Multiple Upgrades Per AP: An AP may require multiple upgrades one after another. For example, an AP may first go through a hardware upgrade and then perform software upgrade. To support multiple upgrades with ordering requirements on an AP, we develop the following algorithm. As before, only the nodes satisfying coverage constraints or no-congestion constraints can be upgraded together. To minimize upgrade time, we select a large schedulable set and schedule the first pending upgrade task from each of the selected nodes.

To further reduce the number of upgrade rounds, we observe some nodes may have more upgrade tasks than others and it can be preferable to schedule nodes with more upgrade tasks early since all their upgrade tasks should finish before the upgrade is complete. Therefore, instead of sorting nodes based on the node degree, here we first sort nodes in terms of the number of upgrade tasks and further sort the nodes with the same number of upgrade tasks in an increasing order of their node degree to increase of the chance of getting a larger schedulable set.

Supporting Variable Upgrade Times: So far, we assume all APs can be upgraded in the same amount of time. Often the time required to upgrade APs vary significantly. When the upgrade time varies across upgrade jobs, our goal can be to minimize the total upgrade time (instead of the number of upgrade rounds).

We make two significant modifications to support these embodiments. First, we sort the jobs in a decreasing order of their upgrade time so that we are more likely to schedule larger jobs earlier since the upgrade typically does not finish until the last job finishes. Second, we schedule the first round of upgrades in a similar way as for coverage formulation and for no-congestion formulation. However, since not all these jobs finish at the same time, whenever one job in the current round finishes, we may potentially schedule new job(s), since the AP that just finishes upgrading may serve some grids and allow new APs to be upgraded without violating coverage or congestion requirements. Therefore, every time a job finishes upgrading, we try to add nodes from the sorted list where the sorting depends on the scenarios (e.g., in terms of node degree when there is one upgrade per node or in terms of the number of upgrade tasks on nodes when supporting multiple upgrades per node and then node degree). We continue adding nodes (or jobs) one at a time to the jobs that are still going through upgrade as long as all nodes (or jobs) are schedulable after insertion (e.g., ensuring coverage and/or no-congestion).

Practical Consideration: We now present several extensions to address practical issues observed in operational cellular networks Supporting Different Generations: From observation, we learn it can be important to support different generations. An AP may run 2G, 3G, and 4G, which can be upgraded independently. For example, a 4G part of the AP can be going through upgrade, while 2G and 3G portions are still working and serving clients. A challenge is how to pick base stations to support the clients that ensure no congestion across generations. This new challenge comes from the coupling between the generations (e.g., 4G clients may be served by 2G, 3G, or 4G). To ensure no congestion across generations, we construct a connectivity graph using APs and grids as follows. An AP running 2G, 3G, 4G are represented as three nodes and the outgoing edges from these nodes have capacities set to the AP capacity of that generation. Moreover, each grid has 2G, 3G, 4G traffic; 2G AP devices can serve 2G, 3G, 4G clients, 3G APs can service 3G and 4G clients, and 4G APs can only serve 4G clients.

To reflect these properties, we use three nodes to represent a grid: one for each generation. We connect a 2G grid to 2G APs to reflect that 2G traffic demands can only be served by 2G APs. Similarly, we connect a 3G grid to 2G and 3G APs to reflect that 3G traffic can be possibly served by both 2G and 3G AP, and connect a 4G grid to 2G, 3G, and 4G APs. We can use previously formulated algorithms to maximize the amount of traffic to serve by a given set of APs. The only significant difference is that the underlying graph becomes larger since we use different nodes to represent a grid that generate traffic demands for different generations and use different nodes to denote APs supporting different generations.

We apply a similar greedy algorithm, which selects a large schedulable set that satisfies the new non-congestion constraint during each round. That is, we gradually add a node from the sorted node list to the upgrade list as long as all traffic can still be supported after its removal. To compute whether the traffic can be supported, we apply the same linear program (LP), except that there are more links in the graph to reflect APs of different generations.

Computation time: A large cellular network may contain hundreds of thousands AP devices. In some cases it can be too expensive to run the algorithms on an entire cellular network or even on a size-able portion. We can apply divide-and-conquer techniques to enhance efficiency by partitioning a cellular network into smaller areas, and apply the algorithm to each of these smaller areas. This can work because if we can find a schedule satisfying coverage or no-congestion in each partition, the global schedule resulting from merging schedules from all partitions still satisfy coverage and no-congestion constraints. Grids in each partition only use APs in their own partition to serve. After merging, the grids can still be covered (or served) by the same set of APs in their partition, without coverage holes or congestion.

A primary issue is that the APs on the boundary can serve clients in different partitions. In order to run a scheduling algorithm within a partition, we essentially pretend these APs can only serve clients in the same partition and cannot serve clients in other partitions. This incurs performance loss since we may require more APs than necessary to cover or serve all clients. To minimize performance loss, we want to minimize the number of such APs (e.g., the APs that are forced to serve grids in one partition even though they can serve multiple partitions).

Thus, we can apply graph partition techniques. Two common objectives have been proposed for graph partition: RatioCut and Normalized cut (NCut). The former normalizes the weights of the edges on the cut by the number of vertices in each partition (e.g., minimizes $$\sum_{i=1}^{k} \frac{W(A_i, \overline{A_i})}{|A_i|},$$

where $W(A_i, \overline{A_i})$ is the sum of all edge weights between $A_i$ and the remaining nodes $\overline{A_i}$, and $|A_i|$ denotes the number of vertices in $A_i$). The latter normalizes the edge weight on the cut by the sum of node degrees in each partition (e.g., minimizes $$\sum_{i=1}^{k} \frac{W(A_i, \overline{A_i})}{vol(A_i)},$$

where $vol(A_i)$ denotes the sum of degrees of all nodes in the partition $A_i$). It is apparent that $$\frac{1}{|A_i|} \text{ and } \frac{1}{vol(A_i)}$$

are minimized when either the number of vertices or the sum of node degrees within each partition is the same. This captures our goal of finding balanced cuts while minimizing the weights of edges on the cut.

Minimizing either RatioCut or NCut is a NP-hard problem. Spectral clustering is an effective scheme to find approximate solutions to this NP-hard problem. A number of spectral clustering techniques have been proposed. As one example, the Meila-Shi algorithm can be used to minimize NCut, since it is the recommended algorithm due to its excellent performance and solid mathematical foundation.

For example, let W be the adjacency matrix with weight wij between the APs i and j, reflecting how many covered grids they have in common. If there are more covered grids in common, it can be preferred to place them in the same partition. The Meila-Shi algorithm takes the eigenvectors corresponding to the k smallest eigenvalues of the normalized graph Laplacian matrix $L_{rw}=I-D^{-1} W$ (where I is the identity matrix) and then invokes another algorithm (e.g., k-means clustering) to cluster points by their respective k components in these eigenvectors. By using the spectral clustering, we can reduce the performance loss arising from partitioning.

Trade-off between upgrade time and performance: So far, we enforce no coverage hole or no congestion during upgrade. In practice, one may tolerate minor performance degradation or coverage holes during upgrade. This is because sometimes it might be desirable to complete the upgrade process as soon as possible while tolerating some performance hit based on the necessity of the required upgrade.

For example, some important tweak in security configuration may be required on an urgent basis, so operators may be willing to incur some performance hit. Our scheduling can be flexible and can smoothly trade-off between upgrade time and performance impact by redefining a schedulable set. For coverage, we consider a set of nodes as schedulable if the number of coverage holes is within a threshold (denoted as $thresh_{holes}$). For congestion, we consider a set of nodes as schedulable if the total throughput that we can support is no less than a threshold of the traffic demands (denoted as $thresh_{tput}$). $thresh_{holes}$ and $thresh_{tput}$ can be adjusted according to the service requirement.

Example Methods

Figure 7:
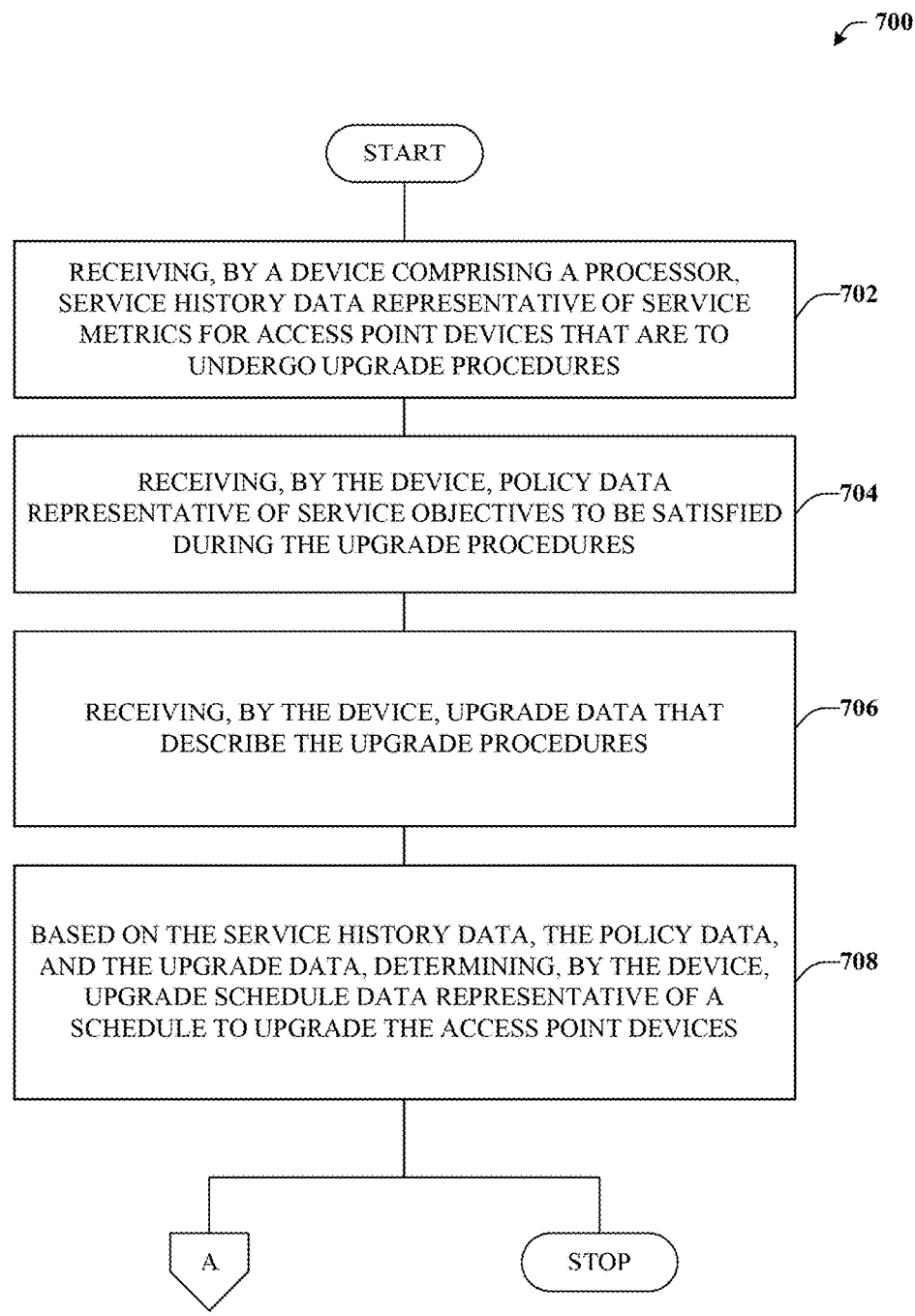
FIG. 7 illustrates an example methodology that can provide for automated and efficient scheduling of upgrades of access point device in accordance with certain embodiments of this disclosure.
Figure 8:
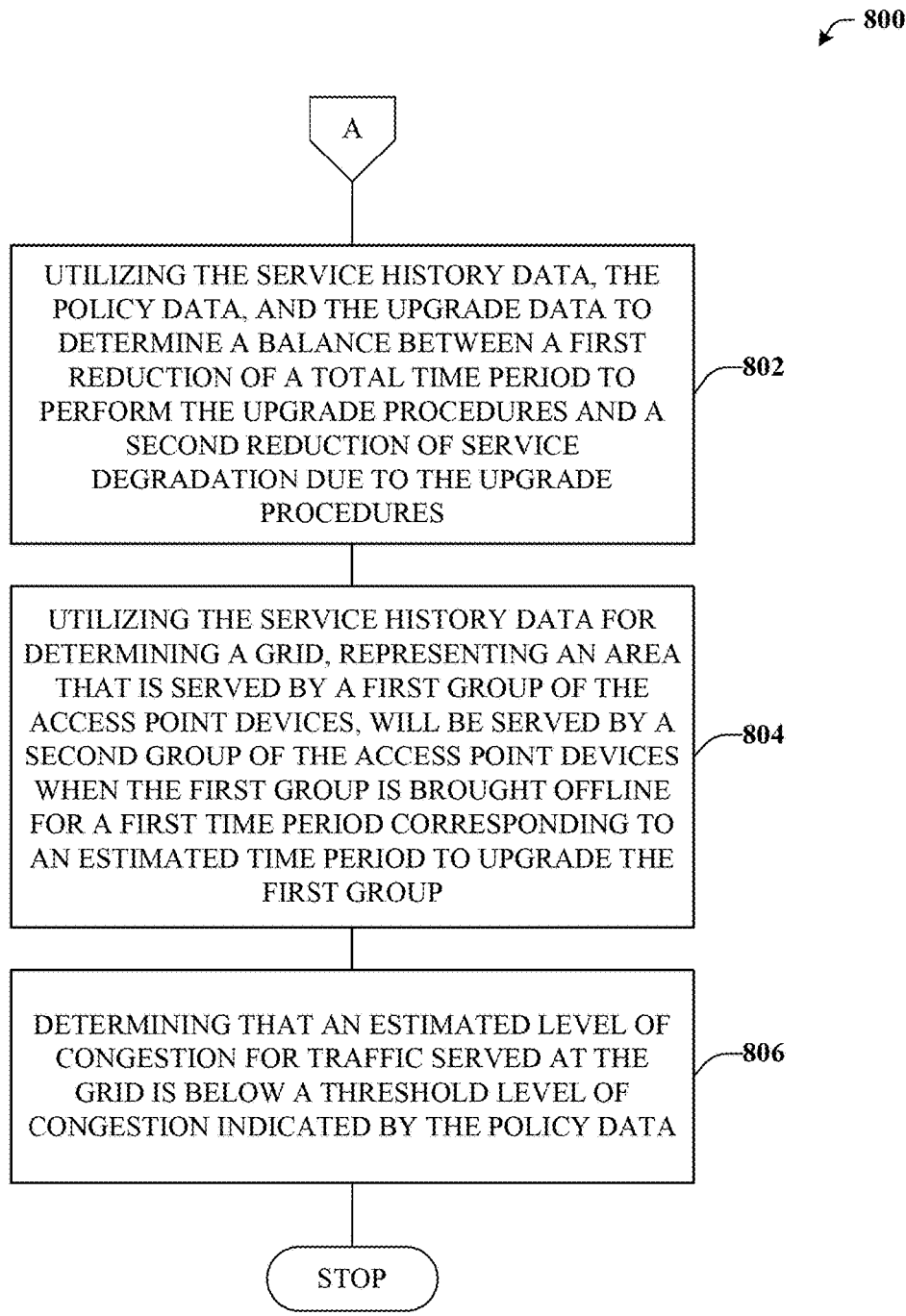
FIG. 8 illustrates an example methodology that can provide for additional elements or aspects in connection with automated and efficient scheduling of upgrades of access point device in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can provide for automated and efficient scheduling of upgrades of access point device. For example, at reference numeral 702, a device comprising a processor can receive service history data representative of service metrics for access point devices that are to undergo upgrade procedures. In some embodiments, such can be provided in response to network traces that can be readily available. In some embodiments such service history data can relate to what is referred to herein as compile-time data such as data collected many days or even weeks, months, years beforehand. In some embodiments, such service history data can relate to what is referred to herein as run-time data such as data collected mere moments, minutes, or hours beforehand.

At reference numeral 704, the device can receive policy data representative of service objectives to be satisfied during the upgrade procedures. In some embodiments, this policy data can relate to goals or objectives that are to be satisfied during the upgrade procedures. For example, such goals can relate to mitigating service holes, mitigating congestion, maintaining a particular throughput or other service quality metric, or the like.

At reference numeral 706, the device can upgrade data that describe the upgrade procedures. In some embodiments, such upgrade data can relate to, e.g., an AP configuration, a number of upgrades to be performed on an AP, a type of upgrade, an estimated upgrade time, and so forth.

At reference numeral 708, the device can determine upgrade schedule data representative of a schedule to upgrade the access point devices. The upgrade schedule data can be determined based on the service history data received at reference numeral 702, the policy data received at reference numeral 704, and the upgrade data received at reference numeral 706. Method 700 can proceed to insert A, which is further detailed in connection with FIG. 8, or stop.

With reference now to FIG. 8, exemplary method 800 is illustrated. Method 800 can provide for additional elements or aspects in connection with automated and efficient scheduling of upgrades of access point device. For example, at reference numeral 802, the device can determine the upgrade schedule data (e.g., determined at reference numeral 708 of FIG. 7) comprises utilizing the service history data, the policy data, and the upgrade data to determine a balance between a first reduction of a total time period to perform the upgrade procedures and a second reduction of service degradation due to the upgrade procedures.

At reference numeral 804, network device can utilize the service history data for determining a grid, representing an area that is served by a first group of the access point devices, will be served by a second group of the access point devices when the first group is brought offline for a first time period corresponding to an estimated time period to upgrade the first group.

At reference numeral 806, the device can determine the grid will be served by the second group when the first group is brought offline comprises determining that an estimated level of congestion for traffic served at the grid is below a threshold level of congestion indicated by the policy data.

Example Operating Environments

Figure 9:
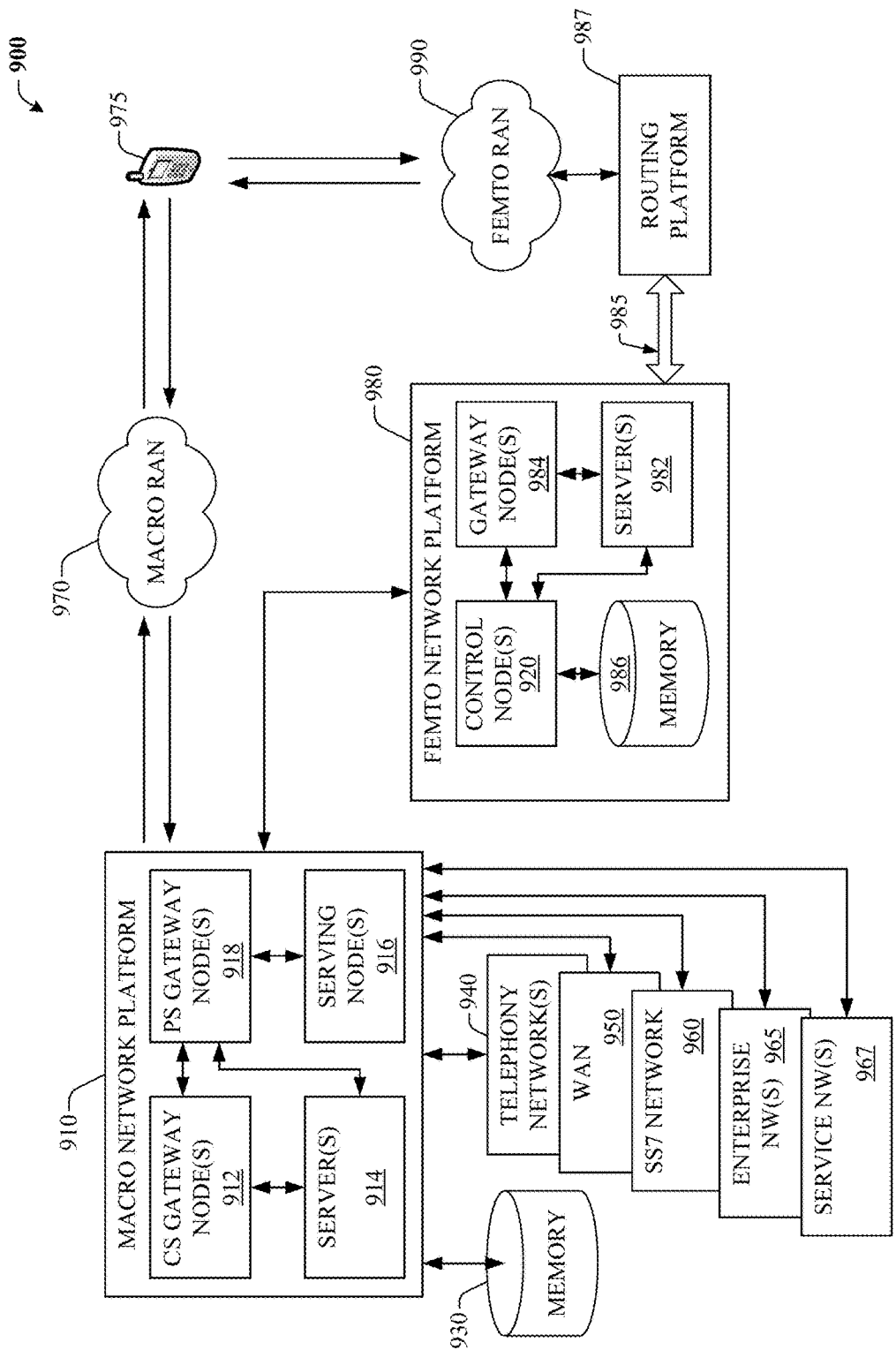
FIG. 9 illustrates a first example of a wireless communications environment with associated components that can be operable to execute certain embodiments of this disclosure.

To provide further context for various aspects of the subject specification, FIG. 9 illustrates an example wireless communication environment 900, with associated components that can enable operation of a femtocell enterprise network in accordance with aspects described herein. Wireless communication environment 900 comprises two wireless network platforms: (i) A macro network platform 910 that serves, or facilitates communication with user equipment 975 via a macro radio access network (RAN) 970. It should be appreciated that in cellular wireless technologies (e.g., 4G, 3GPP UMTS, HSPA, 3GPP LTE, 3GPP UMB, 5G), macro network platform 910 is embodied in a Core Network. (ii) A femto network platform 980, which can provide communication with UE 975 through a femto RAN 990, linked to the femto network platform 980 through a routing platform 987 via backhaul pipe(s) 985. It should be appreciated that femto network platform 980 typically offloads UE 975 from macro network, once UE 975 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 970 can comprise various coverage cells, while femto RAN 990 can comprise multiple femto access points or multiple metro cell access points. As mentioned above, it is to be appreciated that deployment density in femto RAN 990 can be substantially higher than in macro RAN 970.

Generally, both macro and femto network platforms 910 and 980 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 910 comprises CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can comprise traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also comprises serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can comprise one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also comprise substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based) it generates in addition to data received from macro network platform 910. It is to be noted that server(s) 982 can comprise one or more processor configured to confer at least in part the functionality of macro network platform 910. To that end, the one or more processor can execute code instructions stored in memory 986, for example.

Memory 986 can comprise information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
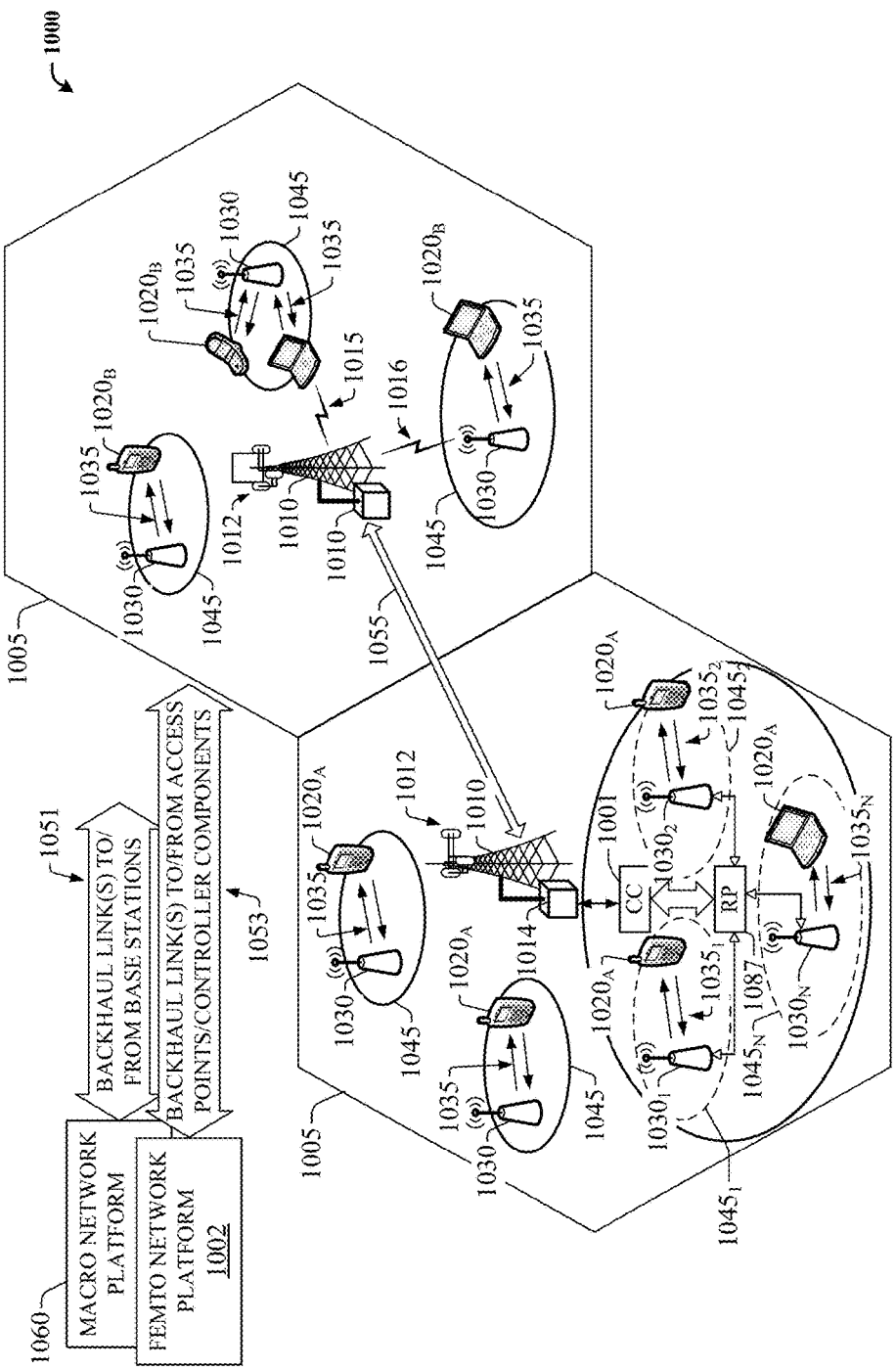
FIG. 10 illustrates a second example of a wireless communications environment with associated components that can be operable to execute certain embodiments of this disclosure.

FIG. 10 illustrates a wireless environment that comprises macro cells and femtocells for wireless coverage in accordance with aspects described herein. In wireless environment 1005, two areas represent "macro" cell coverage; each macro cell is served by a base station 1010. It can be appreciated that macro cell coverage area 1005 and base station 1010 can comprise functionality, as more fully described herein, for example, with regard to system 1000. Macro coverage is generally intended to serve mobile wireless devices, like UE $1020_A$, $1020_B$, in outdoors locations. An over-the-air (OTA) wireless link 1035 provides such coverage, the wireless link 1035 comprises a downlink (DL) and an uplink (UL), and utilizes a predetermined band, licensed or unlicensed, of the radio frequency (RF) spectrum. As an example, UE $1020_A$, $1020_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform 1060; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs $1020_A$ can be routed by the RP 1087, for example, internally, to another UE $1020_A$ connected to a disparate femto AP connected to the RP 1087, or, externally, to the femto network platform 1002 via the CC 1001, as discussed in detail supra.

In wireless environment 1005, within one or more macro cell(s) 1005, a set of femtocells 1045 served by respective femto access points (APs) 1030 can be deployed. It can be appreciated that, aspects of the subject innovation can be geared to femtocell deployments with substantive femto AP density, e.g., $10^4$-$10^7$ femto APs 1030 per base station 1010. According to an aspect, a set of femto access points $1030_1$-$1030_N$, with N a natural number, can be functionally connected to a routing platform 1087, which can be functionally coupled to a controller component 1001. The controller component 1001 can be operationally linked to the femto network platform 1002 by employing backhaul link(s) 1053. Accordingly, UE $1020_A$ connected to femto APs $1030_1$-$1030_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 10, in example embodiment 1000, base station AP 1010 can receive and transmit signal(s) (e.g., traffic and control signals) from and to wireless devices, access terminals, wireless ports and routers, etc., through a set of antennas $1012_1$-$1012_N$. It should be appreciated that while antennas $1012_1$-$1012_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 comprises a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Figure 11:
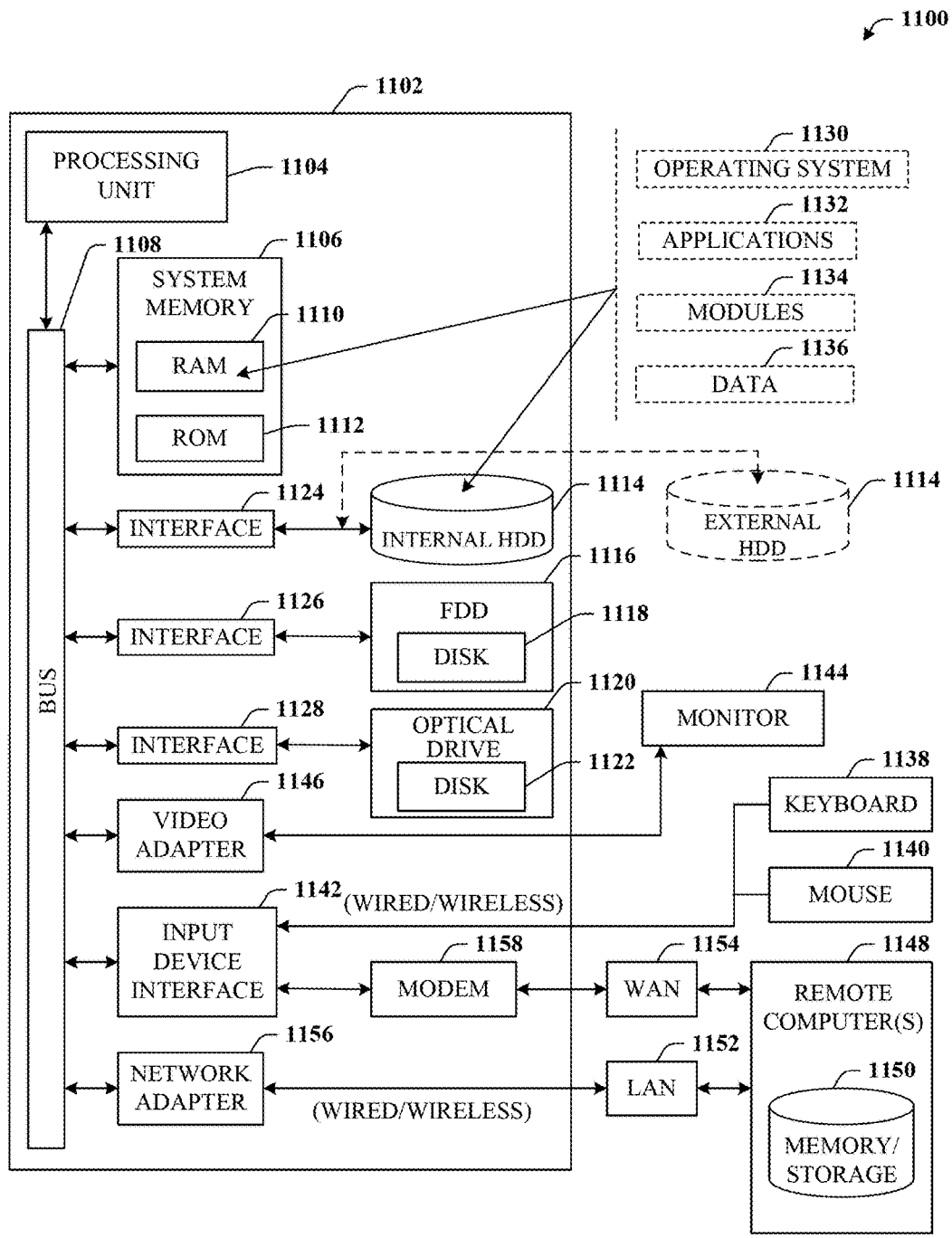
FIG. 11 illustrates an example block diagram of a computer operable to execute certain embodiments of this disclosure.

Referring now to FIG. 11, there is illustrated a block diagram of an exemplary computer system operable to execute the disclosed architecture. In order to provide additional context for various aspects of the disclosed subject matter, FIG. 11 and the following discussion are intended to provide a brief, general description of a suitable computing environment 1100 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network.

In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 11, the exemplary environment 1100 for implementing various aspects of the disclosed subject matter comprises a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also comprise a high-speed RAM such as static RAM for caching data.

The computer 1102 further comprises an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may comprise a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically comprises other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, a mobile device, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
a processor; and
a memory that stores executable instructions that, when executed by the processor, facilitate performance of operations, comprising:
receiving service history data representative of a service metric for access point devices that are to undergo upgrade procedures;
receiving policy data representative of a service objective to be satisfied during the upgrade procedures;
receiving upgrade data that describes the upgrade procedures; and
based on the service history data, the policy data, and the upgrade data, determining upgrade schedule data representative of a schedule to upgrade the access point devices, wherein the upgrade schedule data identifies a first group of access point devices that are to be brought offline concurrently in a first round of the schedule, and wherein members of the first group are determined as a function of a percentage of traffic served within a defined area by an access point device.

2. The device of claim 1, wherein the determining the upgrade schedule data is based on a determined balance between:
a first reduction of a total time period to perform the upgrade procedures and upgrade the access point devices; and
a second reduction of service degradation due to the upgrade procedures.

3. The device of claim 1, wherein the service history data comprises coverage map data representative of geographic coverage areas of the access point devices, wherein the geographic coverage areas are partitioned into grids, and wherein a grid of the grids represents the defined area with a size that is configurable.

4. The device of claim 3, wherein a length and a width of the defined area are in a range of approximately 20 meters to approximately 200 meters.

5. The device of claim 3, wherein the service metric is specific to the grid and is selected from a second group comprising: a received signal strength metric, a traffic utilization metric, a data throughput metric, a number of devices served, a traffic volume metric, and a physical resource block metric.

6. The device of claim 1, wherein the service objective is selected from a second group comprising: mitigating coverage holes, mitigating congestion, reducing coverage holes below a coverage threshold, reducing congestion below a congestion threshold, maintaining a throughput threshold, and maintaining a quality of service threshold.

7. The device of claim 1, wherein the upgrade data comprises data that is specific to an access point device of the access point devices and is selected from a second group comprising: a configuration of the access point device, a count of a number of upgrades, a type of upgrade, and an estimate of time to upgrade.

8. The device of claim 3, wherein the determining the upgrade schedule comprises:
generating degree data comprising a second group of identifiers of the access point devices and corresponding node degrees of the access point devices, and wherein a node degree, of the node degrees, represents an amount of service an access point device, of the access point devices, provides at the grid.

9. The device of claim 8, wherein the determining the upgrade schedule further comprises generating sorted degree data representative of the second group of identifiers sorted according to node degrees.

10. The device of claim 9, wherein the determining the upgrade schedule further comprises generating first round data representative of the first group of access point devices that are to be brought offline concurrently in the first round of the schedule, and wherein members of the first group are further selected according to an order of the sorted degree data.

11. The device of claim 10, wherein the determining the upgrade schedule further comprises an iterative procedure, and wherein the iterative procedure comprises:
selecting an identifier that identifies the access point device with a lowest node degree;
determining that service at the grid satisfies the policy data when members of the first group and the access point device are brought offline to effectuate the upgrade procedures;
adding the identifier that identifies the access point device with the lowest node degree to the first group; and
removing the identifier from the degree data.

12. A machine-readable storage medium, comprising executable instructions that, when executed by a processor, facilitate performance of operations, comprising, comprising:
receiving service history data indicative of a service metric for access point devices that are to be upgraded according to upgrade procedures;
receiving policy data indicative of a service objective to be maintained during the upgrade procedures;
receiving upgrade data that describe the upgrade procedures; and
determining upgrade schedule data indicative of a schedule to upgrade the access point devices based on the service history data, the policy data, and the upgrade data, wherein the upgrade schedule data identifies a group of access point devices that are to be brought offline during a first round of the schedule, and wherein membership of the group is determined as a function of an amount of service within a geographic cover area that is provided by an access point device.

13. The machine-readable storage medium of claim 12, wherein the operations further comprise determining grid data indicative of grids of geographic coverage areas, comprising the geographic coverage area, of the access point devices.

14. The machine-readable storage medium of claim 13, wherein the determining upgrade schedule data comprises generating degree data comprising a list of identifiers of the access point devices and corresponding node degrees of the access point devices, wherein a node degree, of the node degrees, represents the amount of service the access point device, of the access point devices, provides at a grid of the grids.

15. The machine-readable storage medium of claim 14, wherein the determining the upgrade schedule comprises sorting the list of identifiers according to node degrees.

16. The machine-readable storage medium of claim 15, wherein the determining the upgrade schedule comprises generating first round data representative of the first group of the access point devices that are scheduled to be upgraded together in the first round of the schedule.

17. A method, comprising:

receiving, by a device comprising a processor, service history data representative of service metrics for access point devices that are to undergo upgrade procedures;

receiving, by the device, policy data representative of service objectives to be satisfied during the upgrade procedures;

receiving, by the device, upgrade data that describe the upgrade procedures; and based on the service history data, the policy data, and the upgrade data, determining, by the device, upgrade schedule data representative of a schedule to upgrade the access point devices, wherein the upgrade schedule data identifies a first group of access point devices that are to be brought offline during a first round of the schedule, and wherein membership of the first group is determined as a function of an amount of traffic served within a defined area by an access point device.

18. The method of claim 17, wherein the determining the upgrade schedule data comprises utilizing the service history data, the policy data, and the upgrade data to determine a balance between a first reduction of a total time period to perform the upgrade procedures and a second reduction of service degradation due to the upgrade procedures.

19. The method of claim 17, wherein the determining the upgrade schedule data comprises utilizing the service history data to determine a grid, representing an area that is served by the first group of the access point devices, will be served by a second group of the access point devices when the first group is brought offline for a first time period corresponding to an estimated time period to upgrade the first group.

20. The method of claim 19, wherein the grid is determined to be served by the second group based on an estimated level of congestion for traffic served at the grid being determined to be below a threshold level of congestion indicated by the policy data.

* * * * *